United States Patent [19]

Till

[11] Patent Number: 4,667,372
[45] Date of Patent: May 26, 1987

[54] FISH SCALER

[76] Inventor: Morris C. Till, Rt. 1, Box 225, Orangeburg, S.C. 29115

[21] Appl. No.: 852,104

[22] Filed: Apr. 14, 1986

[51] Int. Cl.[4] .............................................. A22C 25/02
[52] U.S. Cl. ........................................... 17/67; 17/64
[58] Field of Search .................. 17/67, 64, 11.1 R, 18

[56] References Cited

U.S. PATENT DOCUMENTS 1,235,085 7/1917 Weinberg ................................ 17/67
4,271,562 6/1981 Penner .................................... 17/67

Primary Examiner—Willie G. Abercrombie
Attorney, Agent, or Firm—Mason, Fenwick & Lawrence

[57] ABSTRACT

A fish scaler has an elongated support shaft having a first free inner end adapted to be received in an electric drill chuck. A larger diameter hub disk is mounted on the support shaft near an end received in the drill chuck and a second hub disk is mounted on the support shaft at a location spaced inwardly from the outer end of the shaft. A plurality of scale flicker rods are mounted in a conical array on the hub disks and have one end connected in the end of the shaft. The entire rotary assembly is free of sharp edges for safety purposes.

20 Claims, 4 Drawing Figures

FISH SCALER

BACKGROUND OF THE INVENTION

The present invention is in the field of fish scalers and is particularly directed to a unique power-driven fish scaler which can be driven by an electric drill or the like to provide a highly effective removal of the scales from a fish.

Numerous devices have been proposed in the past for effecting the scale removal from fish. Such devices have included simple hand implements and have also included power operated scalers such as shown in U.S. Pat. No. 1,235,085 which includes a hand-held rotating member having outwardly protruding teeth which is driven by a flexible drive and rotates so as to effect scale removal when applied to a fish. Other devices have incorporated rotary drum type means having inwardly extending protrusions engageable with a fish placed therein or removing the scales. Other prior art includes U.S. Pat. Nos. 1,620,953; 1,775,693; 2,449,753; 2,653,345; 3,072,956; 3,088,164; 3,304,574; 3,590,424; 3,872,544; 4,106,193; 4,107,819; 4,162,558 and 4,271,562. While the foregoing devices have frequently represented an improvement over the prior art, they have suffered from one or more deficiencies such as causing bruising and damage to the fish, being difficult to clean, being expensive to fabricate and maintain and being incapable of removing scales from difficult to reach areas such as under body areas and those adjacent the dorsal and other fins of fish. Another problem with the prior art devices is that many of them are dangerous to the user.

Therefore, the primary objects of the present invention are the provision of a new and improved fish scaling means which is effective in use, relatively inexpensive to manufacture and maintain and trouble-free and safe in operation.

SUMMARY OF THE INVENTION

The present invention overcomes the aforementioned shortcomings of the prior art in providing a relatively simple to use fish scaler which is mounted in an electric drill or the like and which is capable of removing scales without damaging the fish and is also capable of reaching inaccessible areas to ensure complete scale removal. More specifically, the preferred embodiment of the present invention comprises an elongated support rod or shaft having a first free end which is positionable in the chuck of an electric drill so as to be driven in rotation about its axis. The support rod is provided with a first relatively large disk spaced inwardly from but adjacent its first end and a second smaller diameter of disk spaced inwardly from the outer end of the support shaft. A plurality of scale flicker rods are mounted on the first and second hub disk members and extend in a conical array in planes extending through the axis of the support shaft. The outer ends of the scale flicker rods are bent inwardly and extend into an axial aperture in the outer end of the driven support shaft so that the outer ends can be presented into inaccessible areas of a fish such as adjacent to dorsal fins during operation of the device to effect the removal of scales from such inaccessible areas. The construction is remarkably durable and safe to use in that there are no sharp edges to injure the user or damage the fish. The components are preferably made of metal and the scale flicker rods have their inner ends attached to radial openings in the first hub disk means and extend through transverse openings in the second hub disk means. The inner ends of the rods are held in position in the radial openings by peening and mechanically deforming the areas of the disk adjacent to the rods.

DESCRIPTION OF THE PREFERRED EMBODIMENT

Figure 3:
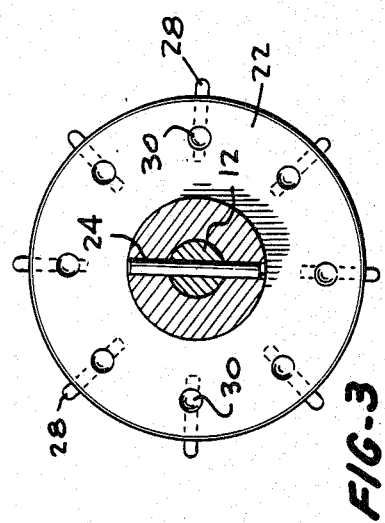
FIG. 3 is a sectional view taken along lines 3—3 of FIG. 2.
Figure 4:
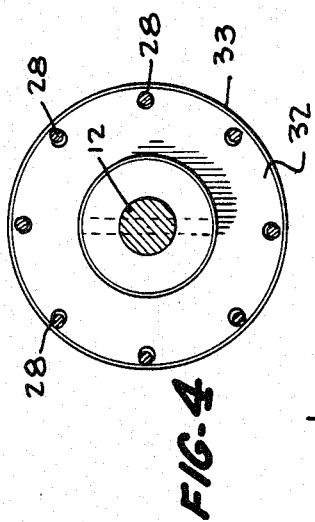
FIG. 4 is a sectional view taken along lines 4—4 of FIG. 2.

The preferred embodiment of the invention, which is generally designated 10, comprises a rotary device including an elongated support shaft or rod 12 having an inner end 14 and an outer end 16. The inner end 14 is received in the chuck 18 of an electric drill or the like 20.

A first relatively large diameter hub disk means 22 preferably formed of stainless steel and having rounded edges 23 is mounted on the support shelf or rod 12 adjacent its outer end 14 and is maintained in driven relationship thereto by drive pin means 24. The relatively large diameter hub disk 22 is provided with a plurality of radial bores 26 equal distantly spaced about its periphery and into each of which the end of a scale flicker rod 28 is positioned. There are eight scale flicker rods 28 and eight corresponding radial bores 26. Peened areas 30 adjacent each of the radial bores 26 provide a clamping operation on the ends of the scale flicker rods 28 to maintain connector end portions of the flicker rods in their illustrated position.

Figure 2:
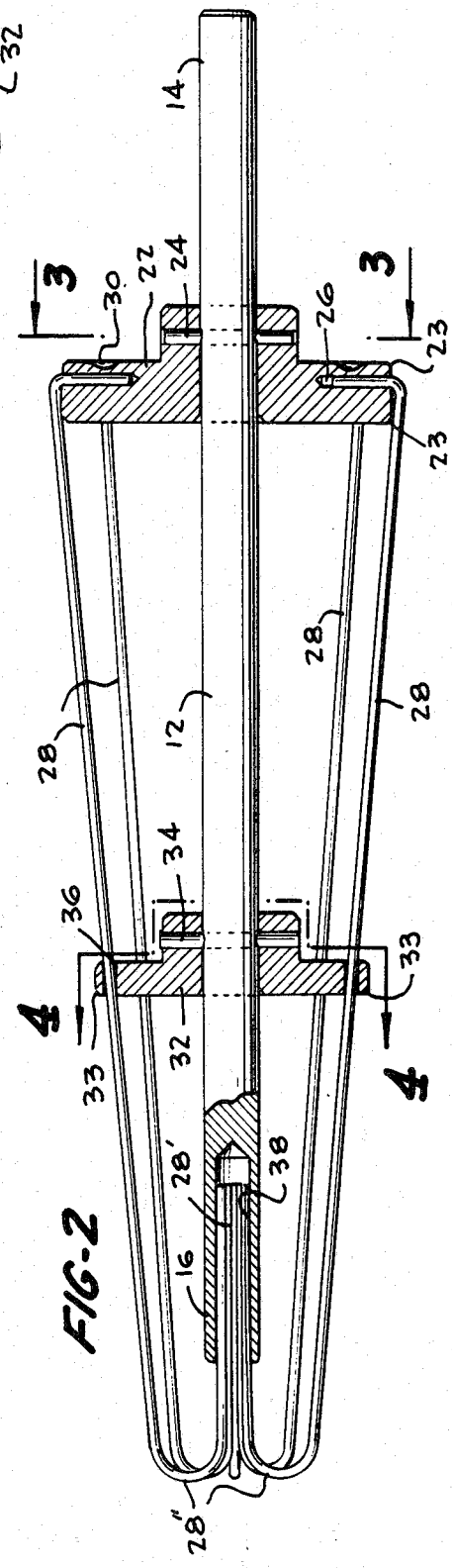
FIG. 2 is a sectional view taken along lines 2—2 of FIG. 1.

A second smaller diameter hub disk 32 having rounded edges 33 is provided outwardly of the first hub disk 22 on the support shaft or rod 12 and is driven thereby by a drive pin 34. Hub disk 32, like, hub disk 22, shaft 12 and scale flicker rods 28, is also preferably made of stainless steel. Additionally, eight transverse bores 36 are provided about the periphery of disk 32 and each receives one of the scale flicker rods 28 which extends therethrough. The bores 36 have a greater diameter than the diameter of the scale flicker rods 28 so as to permit the scale flicker rods to extend thereto at a canted angle as shown in FIG. 2.

An axial bore 38 is provided in the outer end of the support shaft or rod 12 and receives the outer ends 28' of the scale flicker rods 28. It should be observed that the outer end of the scale flicker rods 28 comprise arcuate portions 28" extending between two linear portions comprising the outer portion extending through bore 36 and the inner linear connector portion 28' positioned in bore 38. These arcuate portions can be positioned against inaccessible areas such as adjacent the dorsal fin and underside of the fish for effecting the removal of scales in such areas.

Figure 1:
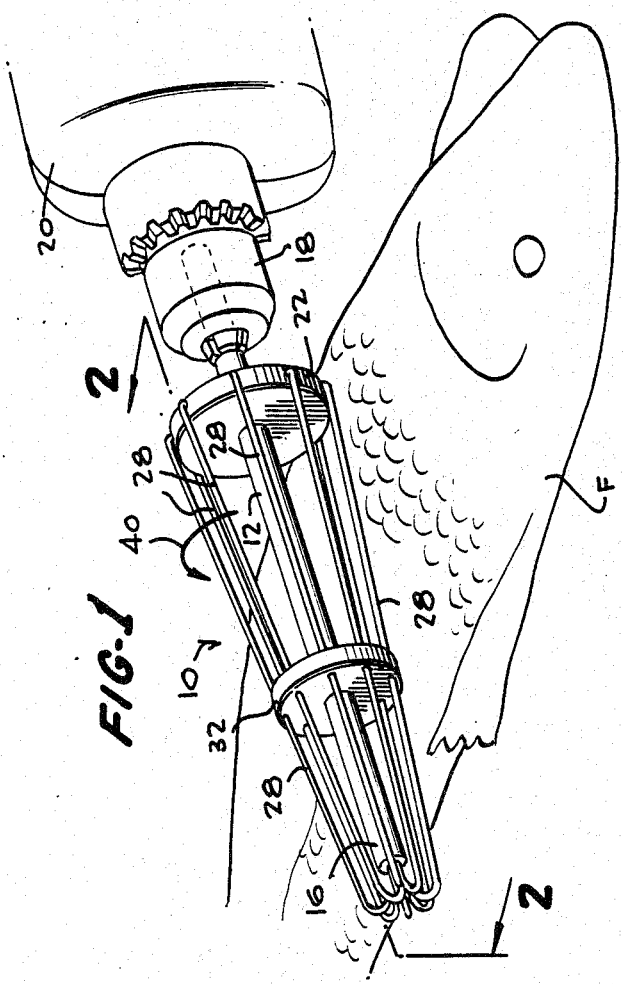
FIG. 1 is a perspective view illustrating use of the preferred embodiment in the removal of scales from a fish and being driven by an electric drill.

In operation, the drill 20 is operated to cause the implement to rotate in the direction of arrow 40 with the fish F being scaled being shown in FIG. 1. The direction of rotation is such that the scale flicker rods engage the scales and flip them upwardly and away from attachment to the body of the fish in a quick and effective manner without gouging, bruising or otherwise damaging the fish body. It will also be apparent that no sharp edges are present to provide a hazard to the user. Also, the arcuate outer ends 28 can be easily positioned on any portion of the fish body including inaccessible areas for the purpose of removing scales therefrom.

The preferred embodiment is formed of stainless steel and is easy to construct and is rugged and reliable while also providing optimum effectiveness in scale removal with minimal damage to the fish or danger to the user.

Those skilled in the art will undoubtedly come forward with variations of the preferred embodiment of the invention which will employ the invention; however, it should be understood that the spirit in scope of the invention is not limited to the preferred embodiment and the extent of the invention is limited solely by the appended claims.

I claim:

1. A fish scaler comprising:
   (a) an elongated support shaft having a first free inner end adapted to be received in driving contact with a driven rotary support member and an outer end having an axial opening;
   (b) a first hub disk means mounted on said support shaft at a location spaced outwardly from said inner end;
   (c) a second hub disk means mounted on said support shaft at a location spaced inwardly from said outer end of said shaft and outwardly of said first hub disk means and being of less diameter than said first disk; and
   (d) a plurality of scale flicker rods mounted adjacent the outer periphery of said first disk and the outer periphery of said second hub disk and comprising a main linear portion extending from said first hub disk, through said second hub disk outwardly beyond said outer end of said support rod, an inwardly curved outer end and a relatively short linear connector portion received in said outer end of said support rod.

2. A fish scaler as recited in claim 1 wherein said first hub disk includes a plurality of radial bores extending inwardly from its outer periphery and in each of which an inner connector portion of one of said scale flicker rods is fixedly mounted.

3. A fish scaler as recited in claim 2 wherein said second hub disk includes a plurality of transverse bores inwardly of its outer periphery and through each of which a central portion of one of said scale flicker rods extends.

4. A fish scaler as recited in claim 3 additionally including drive pin means for providing a driving connection between said disks and said support shafts.

5. A fish scaler as recited in claim 4 wherein said scale flicker rods are formed of metal and said hub disks have rounded edges.

6. The invention of claim 1 wherein said second hub disk includes a plurality of transverse openings extending through it adjacent its outer periphery and wherein one of said scale flicker rods extends through each of said respective transverse openings.

7. The invention of claim 6 wherein said first hub disk is mechanically deformed adjacent said radial bores to clampingly retain said connector portions therein.

8. A fish scaler as recited in claim 1 wherein said first hub disk includes a plurality of radial bores extending inwardly from its outer periphery and in each of which an inner connector portion of one of said scale flicker rods is fixedly mounted, said second hub disk includes a plurality of transverse bores inwardly of its outer periphery and through each of which a central portion of the linear portion of one of said scale flicker rods extends and wherein the linear portions of said scale flicker rods define a conical array.

9. A fish scaler as recited in claim 8 additionally including drive pin means for providing a driving connection between said disk and said support shafts.

10. A fish scaler as recited in claim 8 wherein said scale flicker rods are formed of stainless steel.

11. The invention of claim 10 wherein said second hub disk includes a plurality of transverse openings extending through its adjacent its outer periphery and wherein one of said scale flicker rods is positioned in each of said respective transverse openings.

12. The invention of claim 11 wherein said first hub disk is mechanically deformed adjacent said radial bore to clampingly retain said connector portion therein.

13. A fish scaler comprising a rotary support means, a plurality of elongated scale flicker rods mounted in a substantially conical array on said rotary support means and each having an arcuately curved end extending inwardly from a main linear portion toward the apex of the axis of said conical array.

14. A fish scaler as recited in claim 13 wherein said rotary support means comprises shaft means and carrier means connecting said shaft means to said scale flicker rods.

15. A fish scaler as recited in claim 14 wherein said carrier means includes hub means mounted on said shaft means.

16. A fish scaler as recited in claim 15 wherein said hub means includes a first hub disk having means connecting said first hub disk to one end of each of said scale flicker rods.

17. A fish scaler as recited in claim 16 wherein an outer end of said shaft means includes retainer means engaged with one end of each of said scale flicker means for retaining said one end in position.

18. A fish scaler as recited in claim 17 wherein said hub means includes a second hub disk positioned between said first hub disk and said outer end of said shaft means and retainer means on said second hub disk engageable with said scale flicker rods for maintaining said scale flicker rods in position.

19. A fish scaler as recited in claim 13 wherein said scale flicker rods are of circular cross-section.

20. A fish scaler as recited in claim 19 wherein said carrier means includes hub means mounted on said shaft means and having rounded outer edges.

* * * * *